US008752869B2

(12) United States Patent
Perkins et al.

(10) Patent No.: US 8,752,869 B2
(45) Date of Patent: Jun. 17, 2014

(54) GLOVE BOX ACTUATOR

(75) Inventors: Donald M. Perkins, Sterling Heights, MI (US); Maxwell W. Hamilton, Warren, MI (US)

(73) Assignee: Inteva Products LLC, Troy, MI (US)

( * ) Notice: Subject to any disclaimer, the term of this patent is extended or adjusted under 35 U.S.C. 154(b) by 442 days.

(21) Appl. No.: 13/096,086

(22) Filed: Apr. 28, 2011

(65) Prior Publication Data

US 2011/0265586 A1 Nov. 3, 2011

Related U.S. Application Data

(60) Provisional application No. 61/328,911, filed on Apr. 28, 2010.

(51) Int. Cl.

| | |
|---|---|
| ***E05C 3/06*** | (2006.01) |
| *E05C 1/06* | (2006.01) |
| *E05C 1/12* | (2006.01) |
| *E05C 9/10* | (2006.01) |
| *E05C 9/12* | (2006.01) |
| *F16H 27/02* | (2006.01) |
| *F16H 29/02* | (2006.01) |
| *F16H 29/20* | (2006.01) |

(52) U.S. Cl.
USPC ............... 292/201; 292/33; 292/39; 74/89.14

(58) Field of Classification Search
USPC ........ 292/DIG. 11, DIG. 34, DIG. 68, 32–37, 292/39, 137, 159, 160, 163, 247, 194, 195, 292/201, 138, 142, 144, 279, 280; 74/89.14
See application file for complete search history.

(56) References Cited

U.S. PATENT DOCUMENTS

| | | | | |
|---|---|---|---|---|
| 4,796,932 A * | 1/1989 | Tame | ............................ | 292/112 |
| 7,036,852 B2 * | 5/2006 | Cho | ................................ | 292/33 |
| 7,048,311 B2 * | 5/2006 | Sawatani et al. | ................ | 292/33 |
| 7,182,927 B2 * | 2/2007 | Tran et al. | ..................... | 423/237 |

(Continued)

FOREIGN PATENT DOCUMENTS

| | | | |
|---|---|---|---|
| JP | 2004203349 | A | 7/2004 |
| KR | 1019980034870 | A | 8/1998 |
| KR | 100812931 | B1 | 3/2008 |
| KR | 10-0850978 | B1 | 8/2008 |

OTHER PUBLICATIONS

International Search Report for International Application No. PCT/US2011/034307; International Filing date Apr. 28, 2011; Date of Mailing Jan. 9, 2012; 5 pages.

(Continued)

*Primary Examiner* — Carlos Lugo
*Assistant Examiner* — Faria Ahmad
(74) *Attorney, Agent, or Firm* — Cantor Colburn LLP

(57) ABSTRACT

A glove box actuator is disclosed herein, the glove box actuator having: a motor; a worm gear driven by the motor, the worm gear having a spur gear configured to engage a drive gear pivotally secured to the actuator for movement between a first position and a second position; and an actuation plunger configured to engage a helical cam of the drive gear such that rotational movement of the worm gear is translated into liner movement of the actuation plunger and movement of the drive gear between the first position and the second position causes linear movement of the actuation plunger from a first position to a second position.

20 Claims, 7 Drawing Sheets

(56) References Cited

U.S. PATENT DOCUMENTS

| | | | | |
|---|---|---|---|---|
| 7,263,909 | B2 * | 9/2007 | Weis | 74/425 |
| 7,878,035 | B2 * | 2/2011 | Yamaguchi et al. | 70/161 |
| 8,141,398 | B2 * | 3/2012 | Ookawara et al. | 70/208 |
| 2003/0006616 | A1 * | 1/2003 | Katoh et al. | 292/32 |
| 2005/0104380 | A1 * | 5/2005 | Cho | 292/33 |
| 2007/0200361 | A1 * | 8/2007 | Najima | 292/216 |
| 2008/0231060 | A1 * | 9/2008 | Carabalona et al. | 292/251.5 |
| 2009/0230699 | A1 * | 9/2009 | Carabalona | 292/48 |
| 2011/0309640 | A1 * | 12/2011 | Matsubara | 292/159 |

OTHER PUBLICATIONS

Written Opinion for International Application No. PCT/US2011/034307; International Filing date Apr. 28, 2011; Date of Mailing Jan. 9, 2012; 5 pages.

* cited by examiner

GLOVE BOX ACTUATOR

CROSS REFERENCE TO RELATED APPLICATIONS

This application claims the benefit of U.S. Provisional Patent Application No. 61/328,911 filed Apr. 28, 2010, the contents of which are incorporated herein by reference thereto.

BACKGROUND

Exemplary embodiments of the present invention relate to door and movable panel latches and, more particularly, to glove box door latches for vehicles.

Conventional means of opening a vehicle glove box has been by a purely mechanical device, with either a simple single retracting pawl or a more modern dual side pawl design. An electromechanical means for opening the glove box door will allow for more freedom in the styling of the glove box door or panel and may offering some theft deterring benefits.

However electromechanical systems are labor intensive to assemble and have objectionable sound performance.

Accordingly it is desirable to provide an improved glove box release actuator.

SUMMARY OF THE INVENTION

In accordance with an exemplary embodiment of the invention, a glove box actuator is provided. The glove box actuator having: a motor; a worm gear driven by the motor, the worm gear having a spur gear configured to engage a drive gear pivotally secured to the actuator for movement between a first position and a second position; and an actuation plunger configured to engage a helical cam of the drive gear such that rotational movement of the worm gear is translated into liner movement of the actuation plunger and movement of the drive gear between the first position and the second position causes linear movement of the actuation plunger from a first position to a second position.

In another embodiment, a method of opening a glove box is provided, the method comprising the steps of: rotating a worm gear in a first direction with a motor, the worm gear having a spur gear configured to engage a drive gear pivotally secured to a surface for movement from a first position and a second position as the worm gear is rotated in the first direction; and linearly moving an actuation plunger by engaging a helical cam of the drive gear such that rotational movement of the worm gear in the first direction causes the actuation plunger to be linearly moved from a first position to a second position.

Additional features and advantages of the various aspects of exemplary embodiments of the present invention will become more readily apparent from the following detailed description in conjunction with the drawings wherein like reference numerals refer to corresponding parts in the several views.

Although the drawings and the attached appendix represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION OF EXEMPLARY EMBODIMENTS

Exemplary embodiments of the present invention relate to an actuator or glove box actuator 10 that offers superior sound performance, and relative ease of assembly. In one embodiment, the glove box is the type located in a vehicle wherein the glove box door allows access to a cavity in a dashboard of a vehicle. Of course, it is also contemplated that the actuator or glove box actuator can be used for opening other compartment doors whether they be located in a vehicle or not.

Still further and in automotive environments it is desirable to provide mechanical devices (e.g., powered or otherwise) which are quiet (e.g., offer desired sound performance) such that operation of the same will not create undesirable noises which may be undesirable to the end-user and have deleterious effects on the consumer product.

Figure 1:
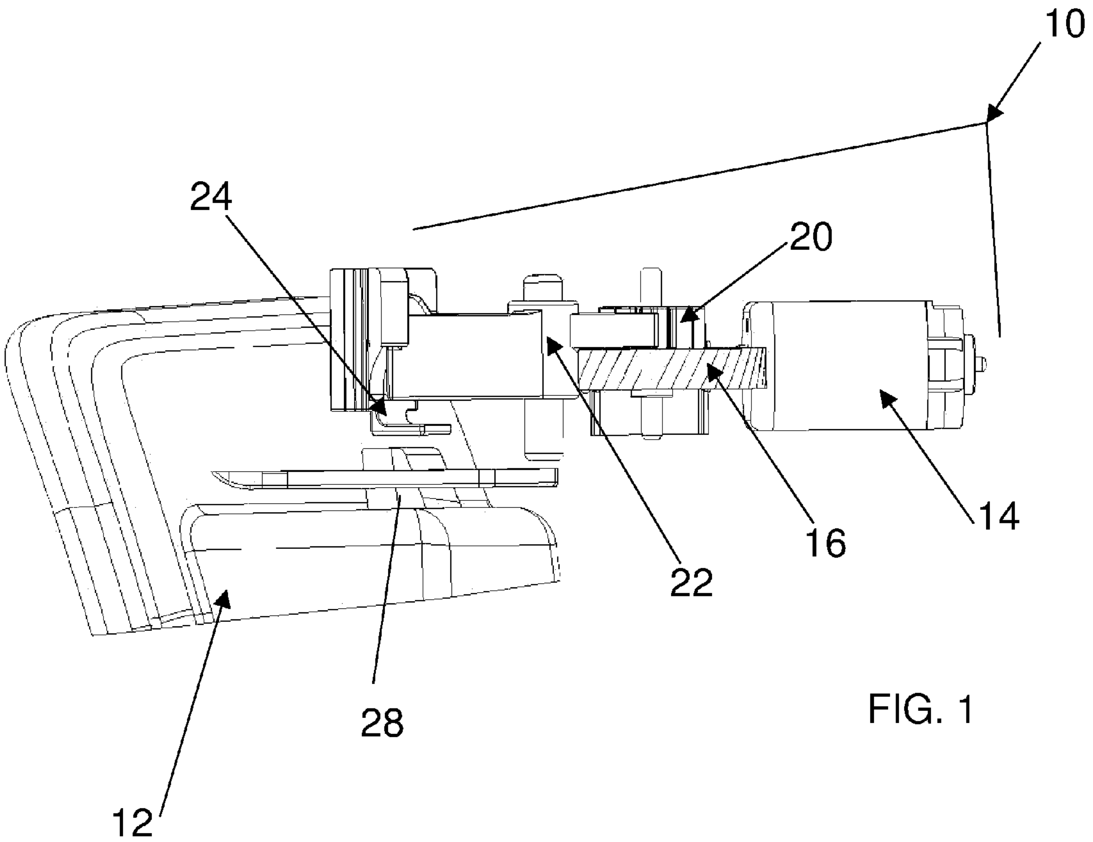
FIG. 1 is a view of a glove box actuator in accordance with an exemplary embodiment of the present invention.
Figure 2:
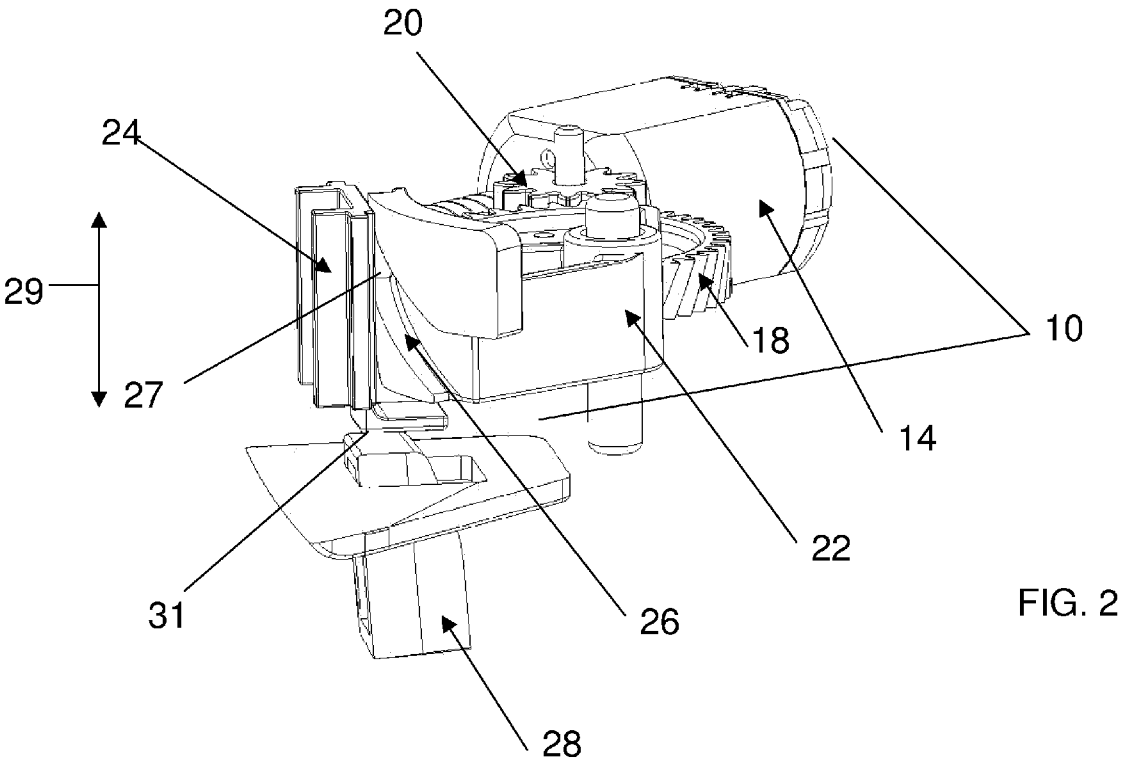
FIG. 2 is a perspective view of a glove box actuator in accordance with an exemplary embodiment of the present invention.
Figure 3:
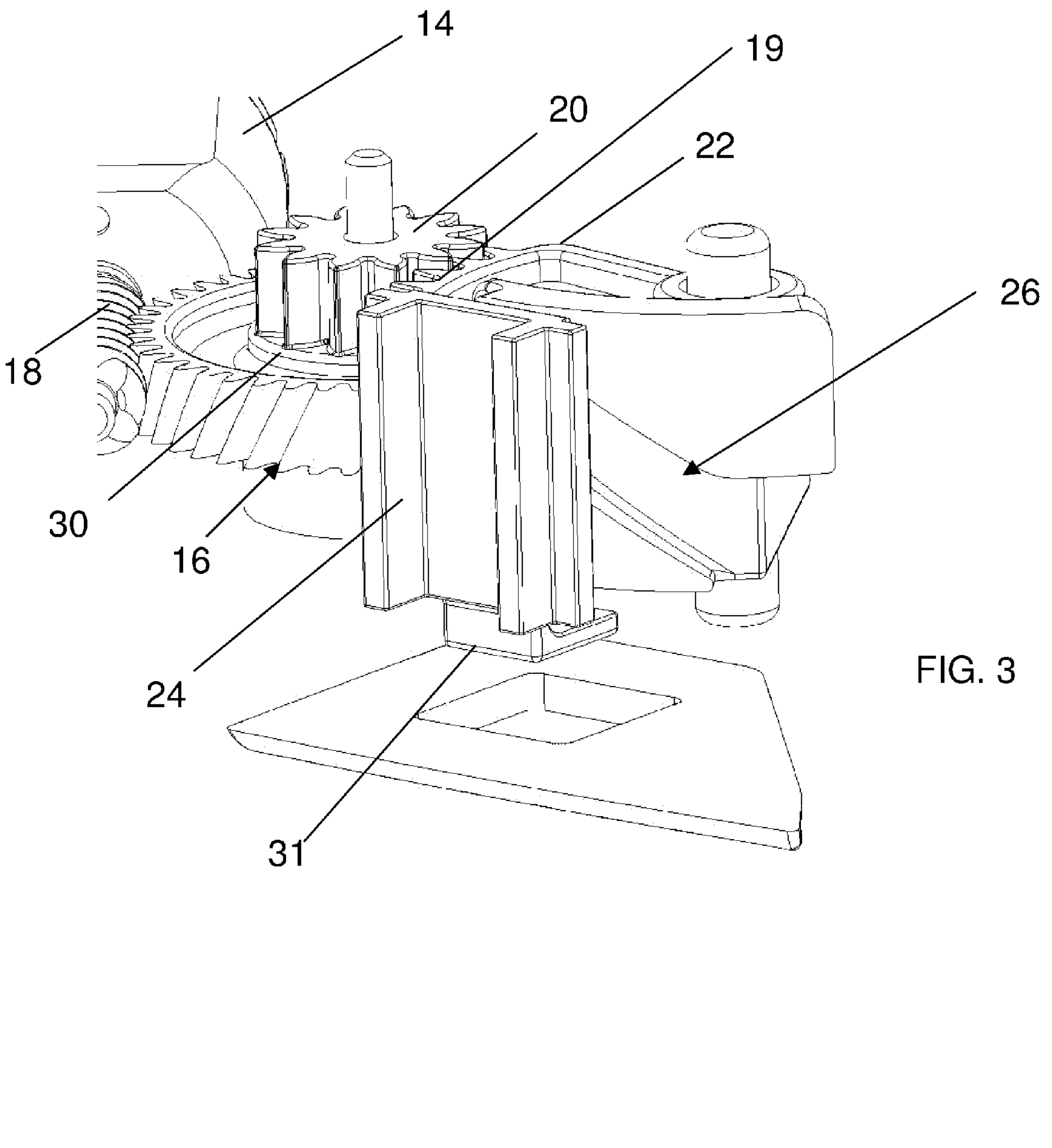
FIGS. 3 and 4 are other perspective views of a glove box actuator in accordance with an exemplary embodiment of the present invention.
Figure 4:
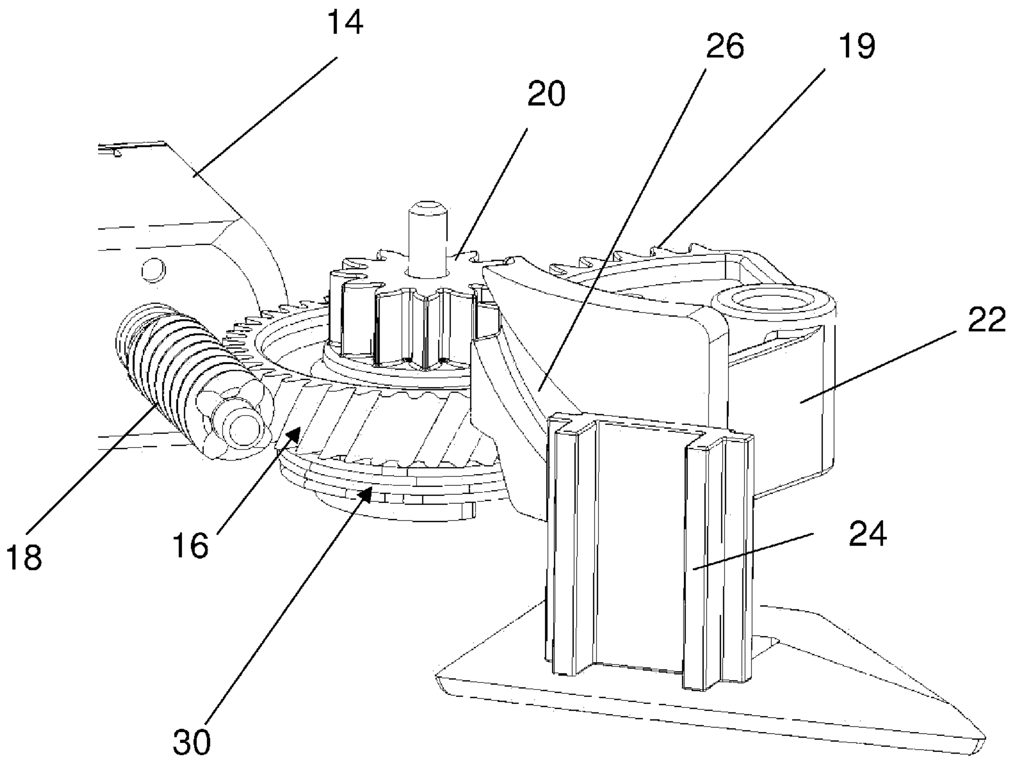
Figure 5:
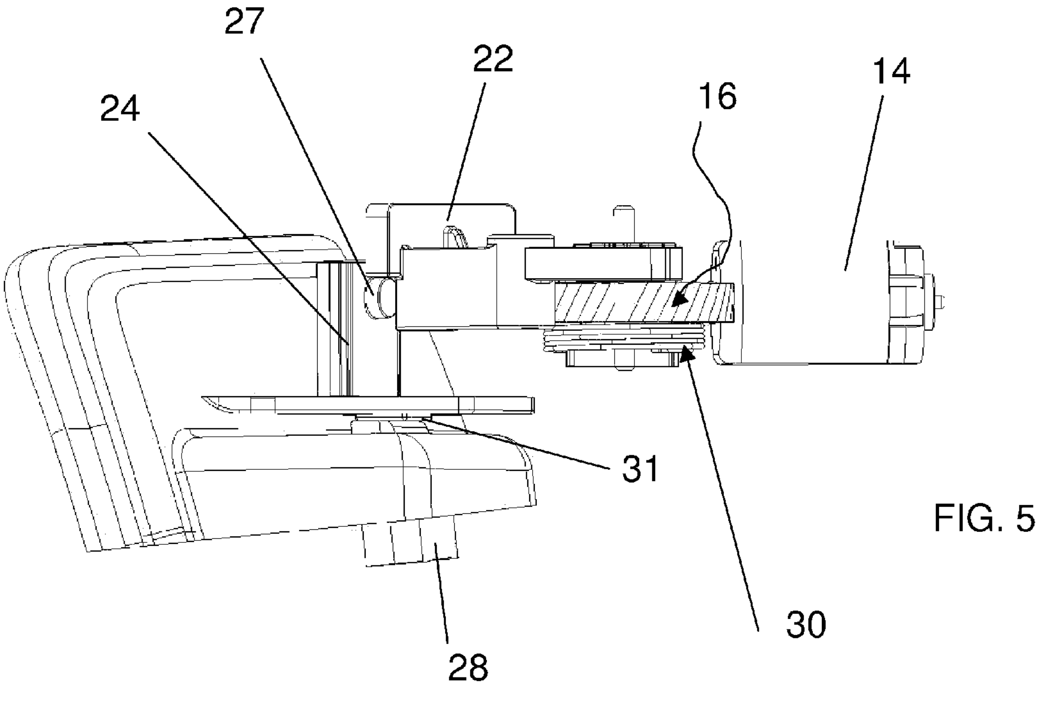
FIG. 5 is a side view of a glove box actuator in accordance with an exemplary embodiment of the present invention.
Figure 6:
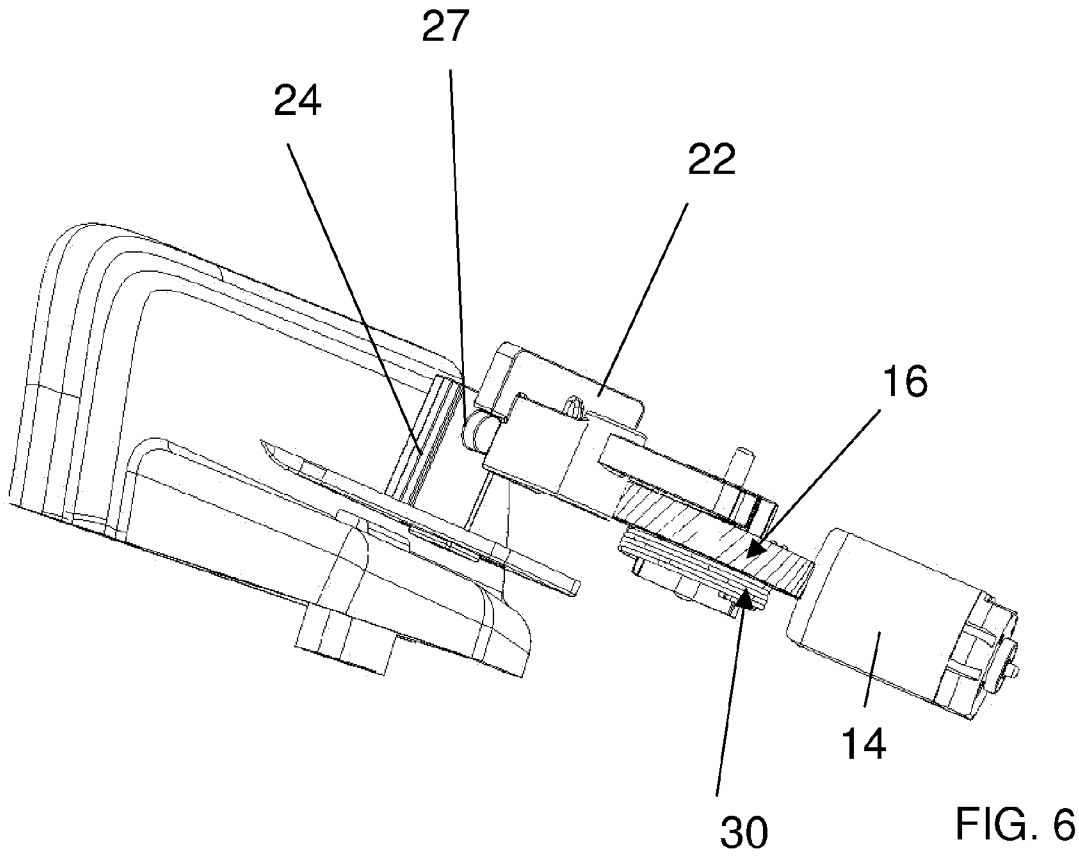
FIG. 6 is a side perspective view of a glove box actuator in accordance with an exemplary embodiment of the present invention.
Figure 7:
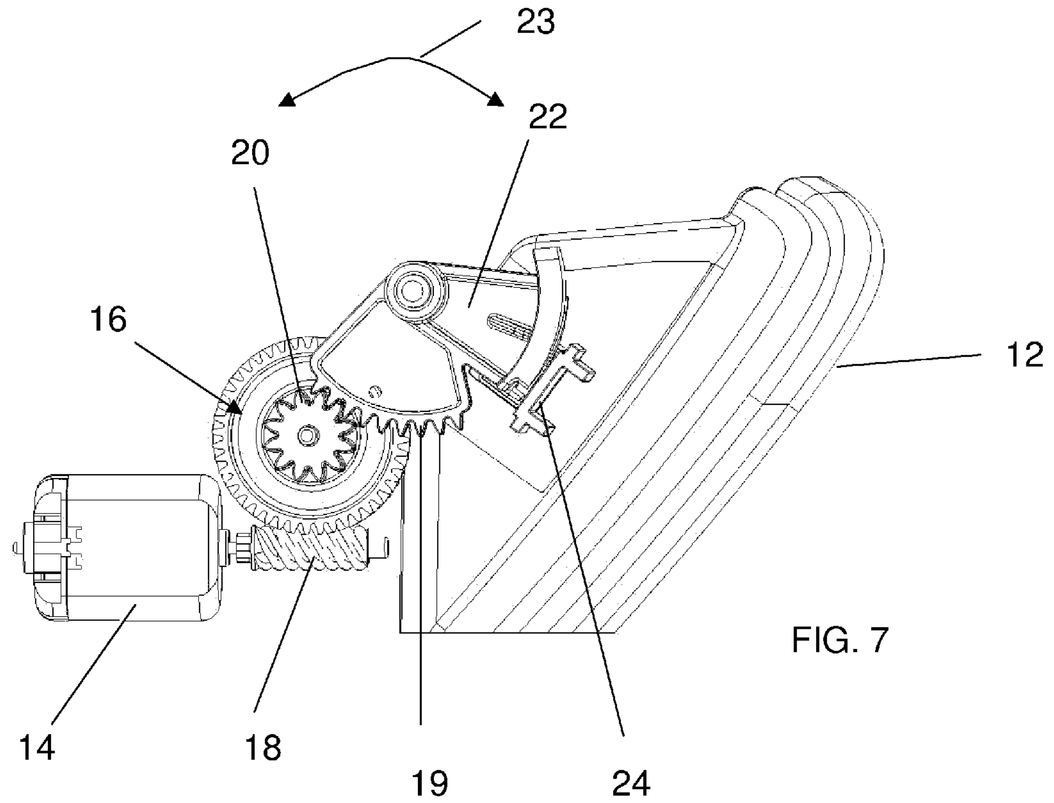
FIG. 7 is a side view of a glove box actuator in accordance with an exemplary embodiment of the present invention.

Referring now to FIGS. 1-7, a glove box actuator 10 is provided. As illustrated, the glove box actuator 10 is configured to remotely open a glove box door 12. The glove box actuator 10 has a motor 14; a worm gear 16 that is driven by a worm 18 of the motor 14. In one embodiment, the motor 14 is remotely driven by a signal, switch or other equivalent means. The worm gear 16 is rotatably mounted to the actuator or any other suitable location and the worm gear 16 has a spur gear 20 this configured to engage teeth 19 of a drive gear 22 pivotally secured to the actuator or any other suitable location for movement between a first position and a second position in the direction of arrows 23. As illustrated, gear reduction is provided through worm 18, worm gear 16, spur gear 20 and teeth 19 of drive gear 22 such that an appropriate amount of power of the motor is directed to an actuation plunger 24 of the actuator 10.

The actuation plunger 24 is configured to engage a helical cam or cavity 26 of the drive gear 22 such that rotational movement of the worm gear 16 is translated into liner movement of the actuation plunger 24 and movement of the drive gear 22 between the first position and the second position causes linear movement of the actuation plunger 24 from a first position to a second position. In one embodiment, the plunger has a feature 27 that is configured to slidably engage helical cam or cavity 26 such that the plunger may move in the direction of arrows 29 as the drive gear is rotated between the first and second positions.

In one non-limiting embodiment, movement of the actuation plunger is along a first axis that is angularly offset from an axis of rotation of the drive gear. In another embodiment, the first axis can be angularly offset from the axis of rotation of the drive gear however the first axis is parallel to the axis of rotation of the drive gear. In still another embodiment, the first axis is perpendicular to the axis of rotation. Of course, other configurations are contemplated to be within the scope of exemplary embodiments of the present invention.

A contact end 31 of the actuation plunger 24 is located proximate to a detent rod or pawl 28 of a glove box door latch such that end 31 contacts the rod or pawl 28 and accordingly the linear movement of the actuator causes movement of the rod or pawl 28 and the movement of the rod or pawl 28 opens the latch or depresses a catch and the glove box door opens by gravity or a spring biased force to allow for access to the glove compartment.

In order to return the drive gear back to the first position a spring biased force may be applied by a spring 30. As illustrated, spring 30 is located on worm gear 16 and in one non-limiting exemplary embodiment spring 30 is a torsion spring. In an alternative exemplary environment, the actuation plunger 24 may be spring biased to its initial or first position via direct contact with a spring biasing member. Alternatively, a combination of spring biasing forces may be used wherein a plurality of springs provide biasing forces to discrete locations of components of the actuator 10. As such, rattle or additional noise concerns can be prevented. Thus, the system is ready to open the glove box again after it has been closed. In one non-limiting exemplary embodiment, the motor is capable of being back driven by spring 30 such that the worm gear is moved back to the first position by spring 30. In addition, this movement of worm gear 16 back to an original or first position will also cause complimentary movement of the drive gear 22 and actuation plunger 24. In addition and as the actuation plunger is moved back to an original or first position, the detent rod or pawl 28 can also move back, which again may be due to a spring biased force being applied to the detent rod or pawl 28.

In accordance with an exemplary embodiment and by using a helical cam surface of a drive gear such that rotational movement can be translated into linear movement of an actuation plunger of the actuator desired sound performance is provided. For example, a DC motor may be used in lieu of a solenoid that has a much higher sound performance due to the cycling of the plunger of the solenoid.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A glove box actuator, comprising:

a motor;

a worm gear driven by the motor, the worm gear having a spur gear configured to engage a drive gear pivotally secured to the actuator for movement between a first position and a second position; and an actuation plunger configured to engage a helical cam of the drive gear such that rotational movement of the worm gear is translated into liner movement of the actuation plunger and movement of the drive gear between the first position and the second position causes linear movement of the actuation plunger from a first position to a second position, wherein the linear movement of the actuation plunger is parallel to an axis of rotation of the drive gear as it moves from the first position to the second position.

2. The glove box actuator as in claim 1, wherein the worm gear is spring biased into a first position corresponding to the first position of the drive gear.

3. The glove box actuator as in claim 1, wherein the worm gear is spring biased into a first position corresponding to the first position of the drive gear by a spring located on the worm gear.

4. The glove box actuator as in claim 1, wherein the actuator displaces a pawl of a glove box latch when the actuation plunger moves from the first position to the second position.

5. The glove box actuator as in claim 1, wherein the helical cam is a cavity located along an outer peripheral surface of the drive gear.

6. The glove box actuator as in claim 1, wherein the actuation plunger further comprises a feature configured to slidably engage the helical cam of the drive gear.

7. The glove box actuator as in claim 1, wherein the spur gear is configured to engage a plurality of teeth of the drive gear and the spur gear has a smaller diameter than the worm gear.

8. The glove box actuator as in claim 1, wherein the worm gear is spring biased into a first position corresponding to the first position of the drive gear and wherein the motor is capable of being back driven by when the worm gear is spring biased into the first position.

9. The glove box actuator as in claim 1, wherein the helical cam is a cavity located along an outer peripheral surface of the drive gear and the cavity extends angularly across the peripheral surface.

10. The glove box actuator as in claim 1, wherein the worm gear is spring biased into a first position corresponding to the first position of the drive gear by a spring located on the worm gear and wherein the actuator displaces a pawl of a glove box latch when the actuation plunger moves from the first position to the second position.

11. The glove box actuator as in claim 10, wherein the helical cam is a cavity located along an outer peripheral surface of the drive gear.

12. The glove box actuator as in claim 11, wherein the actuation plunger further comprises a feature configured to slidably engage the helical cam of the drive gear.

13. The glove box actuator as in claim 12, wherein the spur gear is configured to engage a plurality of teeth of the drive gear and the spur gear has a smaller diameter than the worm gear.

14. The glove box actuator as in claim 13, wherein the worm gear is spring biased into a first position corresponding to the first position of the drive gear and wherein the motor is capable of being back driven by when the worm gear is spring biased into the first position.

15. The glove box actuator as in claim 10, wherein the helical cam is a cavity located along an outer peripheral surface of the drive gear and the cavity extends angularly across the peripheral surface.

16. A method of opening a glove box, comprising:

rotating a worm gear in a first direction with a motor, the worm gear having a spur gear configured to engage a drive gear pivotally secured to a surface for movement from a first position and a second position as the worm gear is rotated in the first direction; and linearly moving an actuation plunger by engaging a helical cam of the drive gear such that rotational movement of the worm gear in the first direction causes the actuation plunger to be linearly moved from a first position to a second position, wherein the linear movement of the actuation plunger is parallel to an axis of rotation of the drive gear as it moves from the first position to the second position.

17. The method as in claim 16, wherein the actuator displaces a pawl of a glove box latch when the actuation plunger moves from the first position to the second position and, wherein the helical cam is a cavity located along an outer peripheral surface of the drive gear and, wherein the actuation plunger further comprises a feature configured to slidably engage the helical cam of the drive gear.

18. The method as in claim 16, wherein the spur gear is configured to engage a plurality of teeth of the drive gear and the spur gear has a smaller diameter than the worm gear.

19. The method as in claim 16, wherein the worm gear is spring biased into a first position corresponding to the first position of the drive gear and wherein the motor is capable of being back driven by when the worm gear is spring biased into the first position.

20. The method as in claim 16, wherein the helical cam is a cavity located along an outer peripheral surface of the drive gear and the cavity extends angularly across the peripheral surface and wherein the worm gear is spring biased into a first position corresponding to the first position of the drive gear by a spring located on the worm gear and wherein the actuator displaces a pawl of a glove box latch when the actuation plunger moves from the first position to the second position.

* * * * *